United States Patent
Ho et al.

(10) Patent No.: US 8,755,412 B2
(45) Date of Patent: Jun. 17, 2014

(54) SYSTEM, METHOD, AND COMPUTER PROGRAM FOR SUPERPOSITION CODED MULTICAST WITH A SINGLE MODULATION SCHEME

(76) Inventors: Pin-Han Ho, Waterloo (CA); Pei Man James She, Waterloo (CA)

( * ) Notice: Subject to any disclaimer, the term of this patent is extended or adjusted under 35 U.S.C. 154(b) by 423 days.

(21) Appl. No.: 13/130,072

(22) PCT Filed: Nov. 20, 2009

(86) PCT No.: PCT/CA2009/001666
§ 371 (c)(1),
(2), (4) Date: May 19, 2011

(87) PCT Pub. No.: WO2010/057303
PCT Pub. Date: May 27, 2010

(65) Prior Publication Data
US 2011/0222462 A1    Sep. 15, 2011

Related U.S. Application Data

(60) Provisional application No. 61/116,764, filed on Nov. 21, 2008.

(51) Int. Cl.
H04L 27/00    (2006.01)
H04L 27/34    (2006.01)

(52) U.S. Cl.
CPC .................................. H04L 27/3488 (2013.01)
USPC ......................................... 370/527; 375/269

(58) Field of Classification Search
None
See application file for complete search history.

(56) References Cited

U.S. PATENT DOCUMENTS

| | | | |
|---|---|---|---|
| 2007/0270170 A1* | 11/2007 | Yoon et al. | 455/509 |
| 2008/0025323 A1* | 1/2008 | Khan | 370/400 |
| 2008/0089354 A1* | 4/2008 | Yoon et al. | 370/432 |
| 2009/0092174 A1* | 4/2009 | Wang | 375/132 |
| 2010/0157901 A1* | 6/2010 | Sanderovitz et al. | 370/328 |
| 2010/0296428 A1* | 11/2010 | Ho | 370/312 |

FOREIGN PATENT DOCUMENTS

WO    WO2005/032035 A1    4/2005
WO    WO2007/089110 A2    8/2007

OTHER PUBLICATIONS

She et al., A Framework of Cross-Layer Superposition Coded Multicast for Robust IPTV Services over WiMAX:, Wireless Communications and Networking Conference 2008, Mar. 31, 2008 to Apr. 3, 2008, pp. 3139-3144.

* cited by examiner

Primary Examiner — Hassan Phillips
Assistant Examiner — Duc Duong
(74) Attorney, Agent, or Firm — Norton Rose Fulbright Canada LLP

(57) ABSTRACT

A cross-layer design architecture is provided for logical superposition coded (SPC) modulation for last-hop wireless data, aiming to overcome the effects of multi-user channel diversity in wireless video multicast. The proposed approach generates a logical SPC modulated signal by mapping successively refined information bits onto layered modulation through dynamic energy allocation and phase keying assignment, which mimics the superposition process for multiple modulated signals in convention hardware-based SPC modulation. At the receiver end, the received logical SPC signal is decoded by implementing a software-based approach on common demodulators without going through the signal-interference cancellation (SIC) process that is necessary in the conventional approach. The approach presented provides comparable or even better overall system throughput than by using the conventional hardware and SIC-based SPC modulation under various scenarios of different histograms of user channel conditions and power allocations for base and enhancement layer information.

33 Claims, 6 Drawing Sheets (a)

(b)

(a)

(b)

(a)

(b)

SYSTEM, METHOD, AND COMPUTER PROGRAM FOR SUPERPOSITION CODED MULTICAST WITH A SINGLE MODULATION SCHEME

FIELD OF THE INVENTION

The present invention relates generally to wireless communication, and more specifically to techniques for enabling wireless data multicasting requiring minimal hardware modifications to a transmitter and requiring no hardware modifications to a receiver.

BACKGROUND TO THE INVENTION

Multicasting or sharing a transmitted signal with information among a group of receivers who are interested in the same content (e.g. data, video, audio, etc.) is generally an effective and scalable way to deliver bandwidth-intensive data in wireless or even wired infrastructure because duplicated deliveries of the same copy of data can be prevented.

Unprecedented advancements in wireless broadband access technologies based on IEEE 802.16 (WiMAX) standards and scalable video coding technologies, such as H.264/MPEG4 Advanced Video Coding (AVC), have made it possible for provisioning large-scale wireless video multicast/broadcast services, such as mobile Internet Protocol Television (IPTV). It is accepted that adopting video multicasting achieves the best scalable usage of transmission capacity, where system resource allocation only concerns the number of TV channels under provisioning along with their bandwidth requirements instead of the number of recipients. This facilitates large-scale and high quality wireless multicasting and broadcasting for video data including scheduled and live TV content, in which multiple receivers are expected to simultaneously receive the bandwidth-intensive data of the same video stream.

However, due to multi-user channel diversity among subscribers in receiving the same wireless multicast signal, it has long been an issue how to select a proper transmission rate. A mono-rate multicast signal could be under-utilizing the channels capability of some receivers with good channel conditions while not decodable by some receivers with bad channel conditions. A straightforward yet dummy solution could be such that the most conservative transmission rate is adopted to seek to satisfy as many recipients as possible, at the expense of a reduced number of TV channels that can be jointly provisioned, which certainly leads to a poor economic scale. Superposition coding (SPC) is a physical layer technique that allows a transmitter to send individual information to multiple receivers simultaneously within a single layered wireless broadcast signal. A SPC signal contains multi-resolution modulated symbols, which enable a receiver to decode its own, as well as its peers', information depending on its channel condition at the instant of decoding. SPC can be employed in a cross-layer design to form the wireless multicast signals for transmitting scalable video bitstreams with multiple quality layers for IPTV services in broadband wireless access (BWA) networks, such as WiMAX. Such a cross-layer design framework can effectively tackle the multi-user channel diversity problem, and the generated multi-resolution modulated signal can scale the multicasting/broadcasting of common successively refined information like scalable video bitstreams. By superimposing multiple quality layer information into a single SPC modulated signal, the receivers with poor channels can decode and obtain the base layer data to achieve basic video perceptual quality, while the receivers with good channel conditions may obtain the data of higher quality layer(s) which refines the data of lower layer(s), in order to yield improved visual perception of video quality.

SPC provides a means by which two or more independent receivers' information may be transmitted to the receivers by superimposing the modulated signals corresponding to each receiver into one single signal. Such superposition of multiple signals could be understood by way of vector addition. SPC can be used, for example, to provide superposition of two or more signals.

FIG. 1 illustrates a vector addition corresponding to SPC of two signals for two receivers, in which $x_1$ with information for receiver 1 is modulated by QPSK for a faster throughput yet a higher channel requirement (i.e. higher SNR requirement), and $x_2$ with information for receiver 2 is modulated by BPSK for a lower channel requirement (i.e. lower SNR requirement) but slower throughput under the same error rate. The superimposed signal, x, is a vector sum of the 2 receivers modulated signals governed by $x=x_1+x_2$. As illustrated in FIG. 1(a), vector x represents the superimposed signal, consisting of symbol '0' and symbol '01'.

The signal x is then launched as a single wireless transmission block and received by two receivers with diverse channel conditions within the same coverage. The received signal may be expressed as $y_i=x+z_i$, where $z_i$ is the noise perceived by receiver i. The conventional decoding technique, known as Signal-Interference Cancellation (SIC), is typically used at receiver i to identify the signal components meant for the other receivers. Receiver i obtains its own information by subtracting those signal components meant for others from its received signal $y_i$. For example, for receiver 2 to decode its data from $y_2$, it must first use SIC to determine the data meant for receiver 1, $x_1$, and then subtract $x_1$ from the received signal $y_2$. The result of the subtraction using SIC is aiming for $x_2$, which is, usually, distorted by the noise experienced at receiver 2, i.e., $z_2$. A schematic representation of these encoding and decoding processes is shown in FIGS. 1(a) and 1(b), respectively, for an intuitive understanding by considering negligible noises.

It can be comprehended that SPC may be optimally used for multicasting successively refined information, such as scalable (layered) video coded bitstreams, instead of independent information. By adopting SPC for scalable video coded bitstreams, a receiver can obtain the data of the base video quality modulated with a slower throughput but lower channel requirement when its channel condition is poor, but another receiver with good channel condition may obtain the full video quality by decoding the data of both base and enhancement video layers since it may be able to demodulate even the signal modulated by the higher throughput modulation scheme.

FIG. 2 illustrates a schematic diagram for the SPC multicast of BPSK and QPSK for a two-layered successively refined video source. The use of SPC modulation enables multi-resolution transmission rates to maximize quality perceived under good channel conditions yet still secure the conservative rate provided for the base layer from the same SPC multicast signal. Those skilled in the art are aware of the effectiveness of using superposition coding in video multicast over wireless channel in order to overcome the multi-user channel diversity.

In spite of the aforementioned advantageous features, few commercially available wireless systems and industry standards related to wireless video multicast have adopted the SPC modulation. The absence of SPC modulation in video multicast is likely attributed to the requirement of additional system support, in which dedicated hardware components and circuitry are needed to superimpose two or multiple modulated signals together to form a SPC signal in the PHY layer. Also, some software modifications are required for enabling the cross-layer mapping between the successively refined video source and the layered modulation by SPC. Current 3G technologies and previous wireless systems failed to justify such an addition of dedicated hardware and software support mostly due to the fact that video multicasting service subscriptions, such as scheduled IPTV, have not reached maturity. These requirements pose both a significant technical barrier and interoperability concerns in adopting and deploying this standard approach for scalable wireless video multicasting in broadband wireless access (BWA) networks.

By envisioning the prevalence of bandwidth demanding video multicasting services provisioned on the emerging BWA networks, it is becoming crucial to define and position a practical implementation of SPC video multicasting that offers the minimal barrier for industry acceptance.

Therefore, what is required is a new design architecture for SPC that mitigates the effect of multi-user channel diversity but that can be used with minimal modifications to existing wireless transmitters and preferably without any hardware modifications to existing wireless receivers.

SUMMARY OF THE INVENTION

The present invention provides a method for transmitting data to one or more receivers linked to a transmitter by a wireless channel, the method characterized by: (a) separating the data into one or more layers, each layer represented by one or more bits; (b) combining the bits of the layers into a bitstream, each possible bitstream combination being representable by a unique data point; (c) generating a modulated signal by modulating the bitstream with a first modulation scheme, the modulation scheme operable to modulate at least as many unique data points as there exist possible bitstream combinations; and (d) transmitting the modulated signal to the one or more receivers, each receiver operable to demodulate at least one of the layers using the first modulation scheme or one or more other modulation schemes, the other modulation schemes operable to demodulate a signal having fewer possible data points than is the first modulation scheme.

The present invention also provides a system for transmitting data to one or more receivers, the system characterized by a transmitter linked to the one or more receivers by a wireless channel, wherein: (a) the transmitter includes or is linked to a data separating means for separating the data into one or more layers, each layer represented by one or more bits; (b) the transmitter includes or is linked to a bitstream generating means for combining the bits of the layers into a bitstream, each possible bitstream combination being representable by a unique data point; and (c) the transmitter includes or is linked to a modulator for generating a modulated signal by modulating the bitstream with a first modulation scheme, the modulation scheme operable to modulate at least as many unique data points as there exist possible bitstream combinations; wherein the transmitter transmits the modulated signal to the one or more receivers, each receiver operable to demodulate at least one of the layers using the first modulation scheme or one or more other modulation schemes, the other modulation schemes operable to demodulate a signal having fewer possible data points than is the first modulation scheme.

The present invention further provides a computer program product comprising computer instructions which, when loaded on one or more computer processors linked to a transmitter operable to transmit data over a wireless channel, are operable to provide a means for transmitting data to one or more receivers linked to the wireless channel, characterized in that the computer program is operable to perform the steps of: (a) separating the data into one or more layers, each layer represented by one or more bits; (b) combining the bits of the layers into a bitstream, each possible bitstream combination being representable by a unique data point; (c) generating a modulated signal by modulating the bitstream with a first modulation scheme, the modulation scheme operable to modulate at least as many unique data points as there exist possible bitstream combinations; and (d) transmitting the modulated signal to the one or more receivers, each receiver operable to demodulate at least one of the layers using the first modulation scheme or one or more other modulation schemes, the other modulation schemes operable to demodulate a signal having fewer possible data points than is the first modulation scheme.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DETAILED DESCRIPTION

Overview

Figure 1:
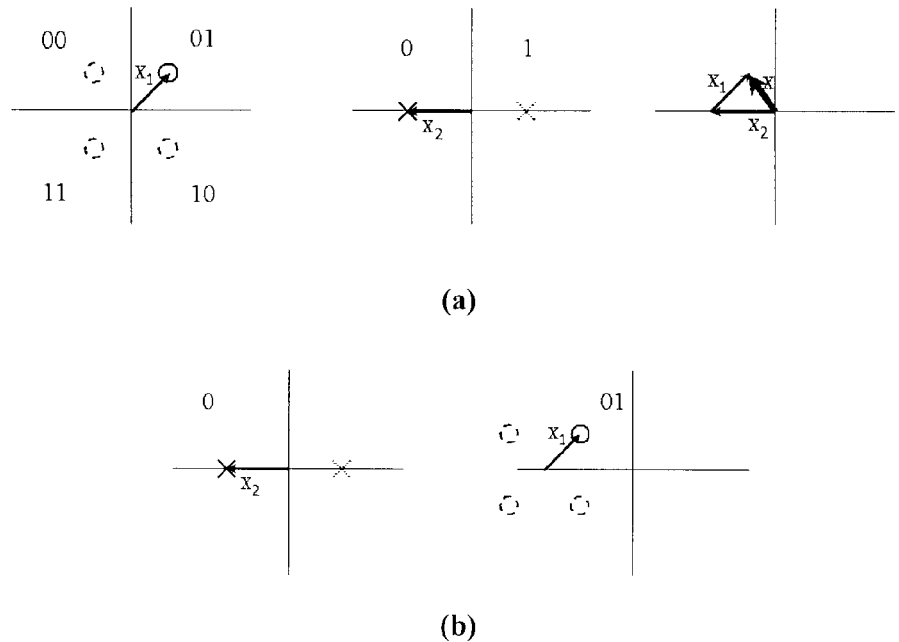
FIG. 1 illustrates a vector addition corresponding to SPC of two signals for two receivers, in which $x_1$ with information for receiver 1 is modulated by QPSK for a faster throughput yet a higher channel requirement (i.e. higher SNR requirement), and $x_2$ with information for receiver 2 is modulated by BPSK for a lower channel requirement (i.e. lower SNR requirement) but slower throughput under the same error rate.
Figure 2:
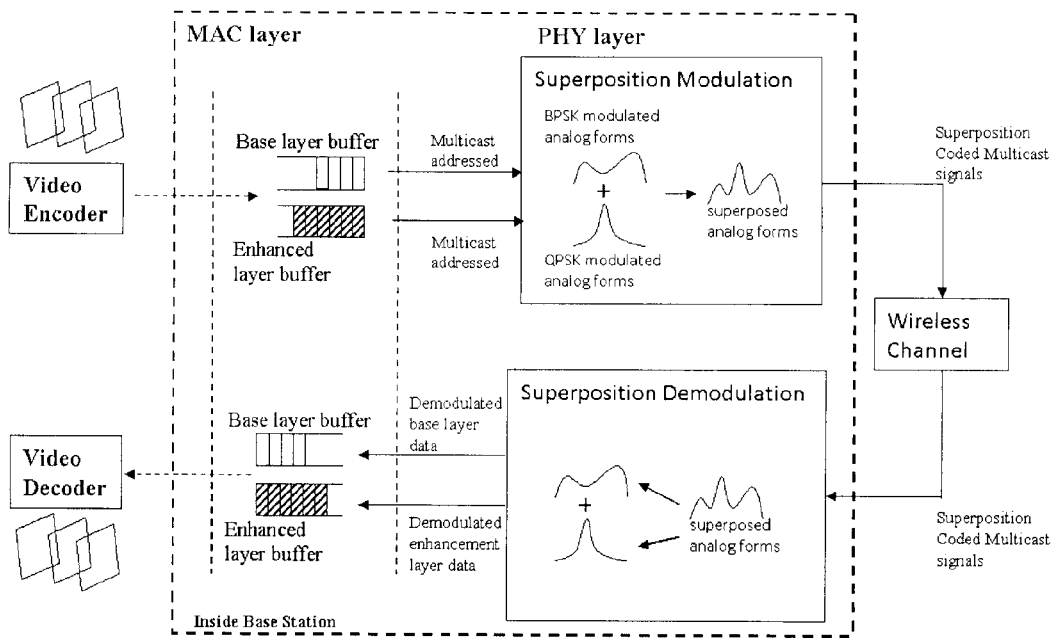
FIG. 2 illustrates a schematic diagram for the SPC multicast of BPSK and QPSK for a two-layered successively refined video source.

The present invention is directed to a superposition coded multicast that can be implemented logically so that it is operable on existing receiver hardware not normally capable of use with typical superposition coded multicast techniques. The present invention discloses a novel cross-layer design architecture of logical superposition coded modulation (SPCM) for multicasting successively refined information that mitigates the effects of multi-user channel diversity, a legacy problem in the scenario of wireless video multicast. The architecture is characterized by not requiring any additional hardware on typical existing wireless systems and standards in generating a physical layer symbol that is logically equivalent (or close to that) in a constellation formed by conventional hardware-based SPCM.

The present invention, in one aspect thereof, may be implemented in typical wireless receivers already on the market because it does not require that the receiver be provided with a SPCM demodulator. More specifically, the receiver in the present invention would not need to be provided with a signal interference cancellation circuit. To achieve this, the present invention, in one aspect thereof, provides a transmitter that modulates the SPCM signal using as few as one modulation scheme whereas a traditional SPCM technique would require at least two modulation schemes.

The logical SPCM technique of the present invention can be contrasted with a traditional SPCM technique as follows. A traditional SPCM signal is often used to transmit successively refined data layers, wherein in a two layer implementation the base layer data is modulated such that it is capable of reception over a poor quality channel (which typically is a modulation scheme that cannot handle bandwidth intensive data) and the enhanced layer data is modulated using a scheme that can handle bandwidth intensive data (which typically is a modulation scheme that cannot be reliably received over a poor quality channel). This allows receivers to receive base layer data when the channel is poor but also to receive enhanced layer data when the channel is good. The logical SPCM technique of the present invention, however, can transmit both layers using just one modulation scheme. The scheme is chosen such that it can transmit at least as many distinct points as would be sent for all layers in the traditional SPCM model (e.g. number of base layer points multiplied by number of enhanced layer points). The receiver in the logical SPCM implementation can still decode the information whether the channel is poor or good, as described more fully below, since the location of constellation points for the modulation scheme is strategically chosen.

In a particular aspect of the present invention, a strategic mapping of the constellation points is provided for information bits of base and enhancement layers from the information into a logical superposition coded (SPC) signal through dynamic power allocation and phase shift assignment. Accordingly, the present invention, in one aspect thereof, can be designed for particular applications wherein the channel is known to be particularly poor or good. At the receiver ends, a subscriber only needs to decode the received logical SPC modulated signals using a standard demodulator and possibly MAC layer software modifications, which can be done in one aspect of the present invention, by way of a software (driver) installation process at the subscribers.

In order to best understand the present invention, the following disclosure discusses the information being layered data representing scalable video bitstream. However, a person skilled in the art would appreciate that communication of any multi-resolution signal data adaptable to successive data layers could be achieved by the present invention. Furthermore, the present invention could be adapted to any wireless transmission implementation including CDMA, GSM, WiMAX, LTE, SC-TMDA, digital satellite radio, digital television, IPTV, or any other wireless transmission implementation.

Furthermore, to best understand the present invention, the following disclosure discusses using BPSK and QPSK modulation schemes to communicate a scalable video coded content source with base and enhancement layers, where two-level SPC modulation is employed in the channel. However, a person skilled in the art would appreciate that the present invention is easily adaptable to model other modulation schemes, combinations of modulation schemes, and numbers of modulation schemes that may also correspond to other numbers of layers or levels.

The present invention can achieve equivalent or better performance in terms of overall system throughput compared with typical SPCM, on top of the gained advantages in terms of much easier implementation and acceptability to the industry and market deployment.

The Logical Superposition Modulation of the Present Invention

The logical SPC modulation scheme of the present invention not only provides an alternative means of realizing the SPC modulation for mitigating the vicious effect of multi-user channel diversity in wireless video applications, but is also operable on currently deployed receivers without hardware modifications thereto. More particularly, receivers operable with the present invention do not require a means of performing signal interference cancellation (SIC).

Nevertheless, logical SPC modulation scheme of the present invention may also be operable on future wireless communication technologies.

Single Modulation Scheme at Transmitter

As previously stated, for simplicity it is assumed that a SPC modulated signal contains and transmits information bits of two quality layers from a scalable video bitsreams. However, the present invention is operable for any number of quality layers of any type of information.

Figure 3:
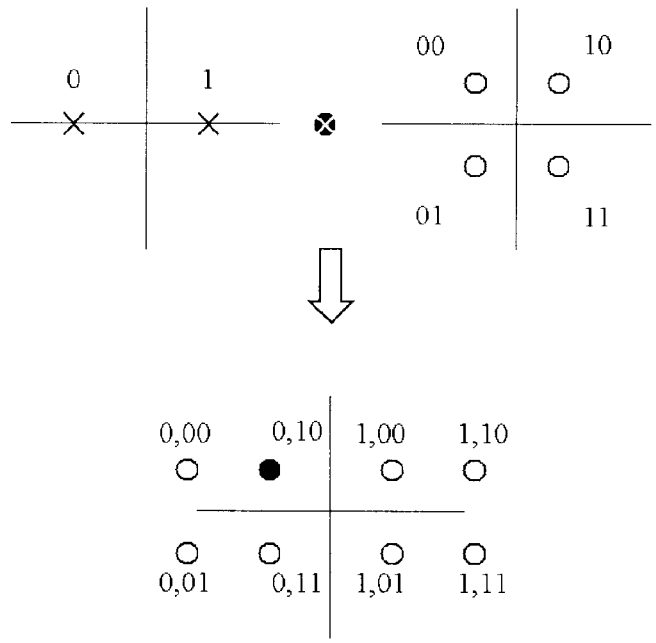
FIG. 3 illustrates a constellation diagram for a three bit wrapper of two conceptual quality layers where the base layer is represented by one bit and the enhanced layer is represented by two bits.

FIG. 3 illustrates a constellation diagram for a three bit wrapper of two conceptual quality layers where the base layer is represented by one bit and the enhanced layer is represented by two bits. As previously illustrated in FIG. 1, a superimposed signal x can be taken as the summation of the two vectors expressed in terms of the corresponding amplitudes and phases in a constellation diagram formed by conventional modulation schemes of BPSK and QPSK. It can be comprehended with reference to FIG. 1 that the resultant constellation diagram of signal x may have eight points each with an associated amplitude and phase.

Such superimposed signal represented by a point on the constellation diagram can be directly generated at the transmitter via dynamic keying of phase shift (i.e. the angle of x in the constellation diagram) and energy (or power) allocation (i.e. the amplitude of x) for signal transmission, which are typically both simple hardware functions realizable through the software control in a transmitter's MAC layer.

Figure 5:
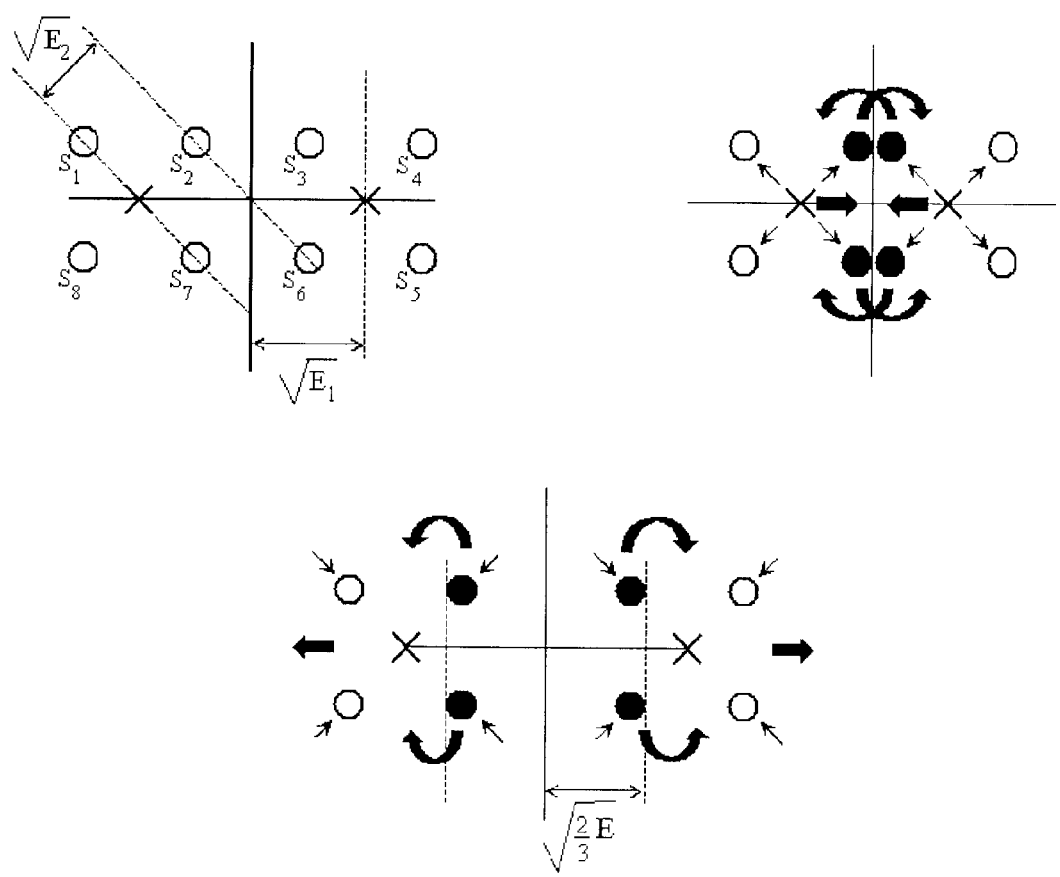
FIG. 5 illustrates the constellation diagram previously illustrated in FIG. 3, wherein two energy measures $E_1$ and $E_2$ are depicted representing energies for modulating signals of the base and enhanced layer of a two layer signal.

FIG. 5 illustrates the constellation diagram previously illustrated in FIG. 3, wherein two energy measures $E_1$ and $E_2$ are depicted representing energies for modulating signals of the base and enhanced layer of a two layer signal. The amplitude and angle of each constellation point may determine its actual location, which may also depend on the allocation ratio of energies for modulating signals using BPSK and QPSK, denoted by $E_1$ and $E_2$, respectively in each transmission. There may be a total energy constraint $E=E_1+E_2$ in each transmission instant, where two relations of energy allocations in employed modulation schemes are derived from the constraint and characterized by a single parameter, $\beta$, such that:

$E_1 = \beta E$ $E_2 = (1-\beta)E$

By identifying the required number of constellation points and manipulating the value of β, the logical SPC modulation can, therefore, generate an equivalent or competing 8-point constellation diagram as that from the standard SPC by superimposing the BPSK and QPSK signals through a hardware component.

However, the approach provided by the present invention may be much more flexible and effective in generating SPC multicast signals logically equivalent to any combination of common modulation schemes. As illustrated in Table I below, by first knowing the modulation scheme for the base layer and enhancement layer data, respectively, the total number of points in a constellation diagram may then be identified. It is clear to those skilled in the art that a conventional modulation scheme (i.e., 8-QAM in the present example) can lead to a similar or equivalent constellation diagram, wherein the same number of constellation points is represented using one modulation scheme without the need for providing a superposition process of two modulated signals (i.e. BPSK and QPSK in the present example).

TABLE I

| enhancement | base | | |
|---|---|---|---|
| | BPSK | QPSK | 16-QAM |
| QPSK | 8 pts | — | — |
| 16-QAM | 32 pts | 64 pts | — |
| 64-QAM | 128 pts | 256 pts | 1024 pts |

With the advanced functions typically provided by current modulation/demodulation DSP chipsets, the single modulation scheme constellation points in the constellation diagram can be configured by manipulating the value of β to logically provide the same amplitude and phase as those generated by a standard approach. To make the constellation points logically equivalent to those from the standard approach, information bits (or referred as symbols from now on) represented by each constellation point from the single modulation scheme may need to be strategically mapped to match the result by the standard approach.

Cross-Layer Mapping at Transmitter

To realize the above SPC modulation scheme for two-layer information, the symbols of m bits from the base layer data and n bits from the enhancement layer must be mapped into a (m+n)-bit wrap. Referring again to the example of BPSK and QPSK illustrated in FIG. 3, where a 3-bit wrap, containing 1 bit from base layer and 2 bits from enhancement layer, is formed and mapped to the constellation diagram with 8 points, the original symbols for both base and enhancement quality layer data can be expressed by a selected combination of conventional modulation schemes illustrated in the above two coordinate planes of FIG. 3.

The mapping of the 3-bit wrap to the 8-point constellation depends on the knowledge about the information bits of a scalable video bitstreams in the application layer. For a symbol referring to '0' in the base layer with BPSK and a symbol referring to '01' in the enhanced layer with QPSK, a corresponding 3-bit wrap containing "001" (i.e. "0"+"01") can be formed and mapped to the symbol '0, 01' in the single modulation scheme constellation diagram of the existing modulation scheme for generating a logical SPC modulated signal equivalent to the standard approach.

To implement the illustrated 2-level logical SPC modulation at the transmitter, a new software module may be required in the existing MAC layer to obtain the dependency knowledge of information bits between bitstreams of two quality layers from a source of scalable video bitstreams, which are buffered in the corresponding queues at the transmitter.

Figure 4:
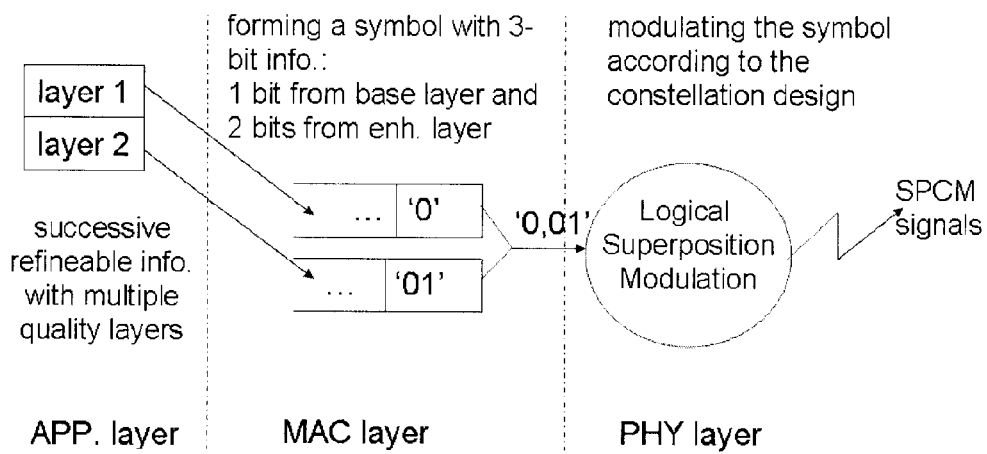
FIG. 4 illustrates the interaction between the modified MAC software with the modulation DSP chipset in the PHY layer to generate the logical SPC multicast signal provided by the present invention.

FIG. 4 illustrates the interaction between the modified MAC software with the modulation DSP chipset in the PHY layer to generate the logical SPC multicast signal provided by the present invention. The interaction may be provided by a set of primitives to that act as a passage for the MAC software to specify the single modulation scheme, in which a constellation point is selected that maps the 3-bit wrap formed by the set of bits at the head of line of the corresponding queues. In the modulation DSP chipset, on the other hand, more functions may need to be added such that some service access points (SAPs) may be defined in order to receive and recognize the parameters passed from the upper MAC software. Furthermore, the chipset should be able to generate the logical SPC modulated signals along with the associated allocated energies. The locations of the symbols in the constellation diagram can be dynamically determined by the given amplitude and phase for each symbol through the control of β, which can determine the transmission performances required for the application, in terms of the symbol error rate (SER) or overall symbol throughput. The optimal selection of β for a given implementation is discussed in more detail below.

Leveraging Existing Receiver Demodulators

It is typically a simple procedure to provide a software update to existing hardware relative to modification of the hardware itself, which would be required by the standard SPC multicast solutions. The present invention, in one aspect thereof, provides advantages over the standard SPC multicast solutions since it uses a modulation scheme that enables demodulation of at least the base layer information by a receiver, regardless of whether the receiver is equipped with such a software update, is not equipped with a software update but is compatible with conventional superposition coding, or is neither equipped with a software update nor compatible with conventional superposition coding.

A receiver operable with the present invention may decode the base layer and, when the channel condition is good, enhanced layer data of a multi-resolution signal transmitted in accordance with the present invention. Although the modulation scheme of the present invention differs from that of the standard SPC multicast solutions, a receiver with poor channel conditions is still able to decode the base layer data of the received signal. Similar to the standard SPC demodulation using SIC hardware, the logical SPC demodulation scheme allows the decoding of the base layer information directly using a lower order modulation scheme such as BPSK when the receiver channel condition is poor. With reference to FIG. 3, for example, the first bit '0' belonging to the base layer can be always obtained when the received logical SPC signal is interpreted as any symbol on the left hand side of constellation diagram by the BPSK demodulators.

One advantageous aspect of the present invention over the standard SPC multicast solutions is that the logical SPC demodulation scheme does not require the receiver to use the lower order modulation scheme to decode the base layer information. Alternatively, the receiver could decode the base layer information using a higher order modulation scheme such as 8QAM even when the receiver channel condition is poor. Due to the strategic location of the constellation points as herein described, the error rate for obtaining only the base layer bit is the same using 8QAM and BPSK. Therefore, even if using 8QAM results in errors in the enhanced layer bits, there is no increased likelihood of error in receiving the lower layer bit relative to using BPSK.

The present invention provides further advantages over the standard SPC multicast solutions where a good channel condition is observed and the enhanced layer information is receivable for a particular receiver. Instead of the standard SIC demodulation scheme whereby the base layer symbol is subtracted from the received signal to obtain the enhancement layer symbol, a receiver in the present invention can demodulate the logical SPC signal directly using an 8-QAM demodulator to obtain all three bits. Therefore, since no subtraction at the hardware level is required, the received logical SPC modulated signals can be decoded using existing modulation schemes already implemented in commercially available hardware chipsets.

A further advantage of the present invention is that demodulation of the logical SPC multicast signal is possible even for legacy receiver devices where the receiver is provided with only one demodulator, or where there is no possibility of a software upgrade at the receiver.

If the receiver is not or cannot be upgraded and also does not support conventional superposition decoding, the base layer bit can still be recovered using BPSK, as described above. If the receiver is not or cannot be upgraded but does support conventional superposition coding, both the base layer and enhanced layers can be properly decoded using the conventional approach using signal interference cancellation, since BPSK can be used for the base layer and QPSK can be used to decode the enhanced layer, with signal interference cancellation being used to remove the base layer bit.

Software Support at Receiver

To demodulate the logical SPC multicast signal with multi-resolution demodulation, the receivers need only know about which two common modulation schemes from the transmitter should be considered. A software module may be provided to choose the scheme according to the instantaneous channel condition at the receiver. As would be appreciated by a person skilled in the art, a lower order modulation can be more robust than a higher order modulation under the same SNR. In order to secure higher precision for recovering the base layer bit, the software can strategically instruct to demodulate the received signal twice by using both BPSK and 8-QAM when the receiver channel condition supports both schemes.

Assuming the result from the BPSK demodulation is $a_1$, and the result from the 8-QAM demodulation is $b_1 b_2 b_3$, then the result observed at the application layer may be $a_1 b_2 b_3$. Since $a_1$ is the most important (i.e. base layer or required bit), which is obtained by using the most reliable demodulation scheme (i.e., BPSK), a better perceived video quality can be achieved. This is one advantage achievable in the MAC layer at the receiver with minimal signalling and software modification due to use of existing demodulator hardware. All that may be required is that, firstly, the signalling between the transmitter and receivers has to define two modulation schemes for each SPC demodulation block; secondly, the MAC software may need to split each obtained symbol into two portions, where the bits of the first part are assigned to the buffer for base layer and the bits of the remaining are assigned to the buffer for the enhancement layer; and thirdly, the video decoder in the application at the receiver devices may have to extract these two portions of bit information individually to reconstruct the scalable video stream.

Reduction of Symbol Error Rate

Although the logical SPC modulation and the standard SPC modulation scheme have the same number of points and logical meaning of each symbol in the constellation diagram, the relative performance of the schemes may differ due to the distance between adjacent points. While the standard SPC modulation scheme typically provides data points that are equidistant from adjacent data points, the logical SPC modulation scheme of the present invention provides points that may not have such characteristics. The spacing of data points typically affects the symbol error rates and overall symbol throughput experienced at the receiver, and providing equidistant data points is typically believed to optimally mitigate the symbol error rate. Nevertheless, the constellation provided by the present invention can be shown to outperform the standard SPC modulation scheme.

Equally distanced symbols is not necessarily a desired implementation when transmitting layered successively refined information using SPC modulation which requires dependent knowledge of information bits between successive quality layer as well as providing scalability in the presence of multi-user channel diversity under wireless multicast. It is, rather, preferred that the distances of constellation points is aimed to decode the symbol referring to the information bit of base layer easier. Therefore, the unequal distance between any pair of adjacent points in the single modulation scheme is preferred in designing the constellation points. On the other hand, certain limits may also exist regarding the possible distances due to the support of using existing demodulators at the receivers as well as other environmental factors and network operation policies, such as user channel profiles, video quality requirement/threshold, and source coding parameters.

Unequal Distances and Limits of Constellation Points

The present invention, in one aspect thereof, provides optimal performance through dynamic power allocation and phase shift assignment. The power allocation and phase shift may be tailored to particular applications wherein the channel is known to be poor or good, or could be assigned dynamically based on feedback from receivers on the throughput that is being achieved. These and other possibilities can be appreciated by those persons skilled in the art.

To ensure that a logical SPC modulated signal is completely decodable (or partially decodable for base layer information), the transmitter should be provided such that all points (or the points for base layer information bit) in the constellation diagram can be well recognized at the receiver by using a pair of common receiver demodulators. This may place strategic conditions on the energy allocation factor $\beta$, giving rise to a lower and upper bound for $\beta$ to restrict the resultant locations of the constellation points.

Referring again to FIG. 5, a logical SPC modulated signal may be generated to mimic the standard approach using BPSK and QPSK with energy $E_1$ and $E_2$, respectively, yielding 8 points in the constellation diagram. The dark shaded symbols in FIGS. 5(b) and 5(c) refer to the lower and upper bounds of $\beta$ under the common energy constraint $E=E_1+E_2$.

From a constellation diagram point of view, as $\beta$ is decreased (see FIG. 5(b)), the symbols of base layer information may move closer together while symbols of enhancement layer may move apart. The opposite may hold for increased values of beta (see FIG. 5(c)). A lower bound, which may for example correspond to $\beta=0.333$, may be reached when the dark shaded symbols in FIG. 5(b) approach the vertical axis to favour demodulation of enhancement layer symbols. To use a standard 8-QAM decoder, an upper bound, for example corresponding to $\beta=0.9499$, may also need to be satisfied while favouring the demodulation of base layer symbols. If $\beta$ falls outside this range, the dark shaded middle symbols may cross the corresponding decoding regions and would therefore not be recoverable. The selected value of $\beta$ may determine the performance of the logical SPC modulation.

Analysis of Symbol Error Rate

The selection of an appropriate $\beta$ that determines $E_1$ and $E_2$ may affect the locations of the constellation points and the impact on the resultant SER when decoding at a receiver in both situations where only the lower order modulation for base layer data is supported and where both lower and higher order modulations for the whole data is supported.

Without loss of generality, the following analysis is conducted based on logical SPC modulation with 8 points in the constellation diagram along an additive white Gaussian noise (AWGN) channel, where the receivers perform SPC demodulation based on the BPSK+QPSK combination. Due to the AWGN channel, the coordinates of symbol $s_i$ can be disturbed by the normally distributed Gaussian noise, $N_0$, on top of the allocated energies $E_1$ and $E_2$. Thus, the coordinates of the 8 points in the constellation diagram, $s_i$: $(x_1, x_2)$, become normal variables and can be expressed as:

$$x_1 \sim N\left[\pm\sqrt{E_1} \pm \sqrt{\frac{E_2}{2}}, \frac{N_0}{2}\right]$$

$$x_2 \sim N\left[\pm\sqrt{\frac{E_2}{2}}, \frac{N_0}{2}\right]$$

A demodulation mechanism may be provided at the receiver to enable the standard 8-QAM demodulator to be employed to decode the SPC modulated signal. When the SNR of the j-th receiver (denoted as $SNR_j=10\log(E/N_0)$) is at least a predefined threshold (denoted as $SNR_{th}$), receiver j may collect all three bits yielded from the standard 8-QAM demodulator. Otherwise, receiver j may only collect the first bit of the symbol, which corresponds to the base layer information. The above mechanism may require additional intelligence in the MAC layer and can be easily implemented with driver software modifications in the customer premise equipment. As previously stated, however, the base layer could also be decoded using BPSK.

The Receivers of Bad Channels

Where the receiver is subject to a poor channel condition, the lower order modulation (BPSK in the example presented) may be used at the receiver. The expression for the cross-over error probability (i.e. the probability that a transmitted symbol will be decoded by the receiver as an adjacent symbol), $P(e|s_i)$, given the transmitted symbol $s_i$, can be expressed as follows:

$$P(e|s_i) = \begin{cases} Q\left[\sqrt{\frac{2}{N_0}}\left(\sqrt{E_1}+\sqrt{\frac{E_2}{2}}\right)\right], & \text{for } i=1,4,5, \text{ and } 8. \\ Q\left[\sqrt{\frac{2}{N_0}}\left(\sqrt{E_1}-\sqrt{\frac{E_2}{2}}\right)\right], & \text{for } i=2,3,6, \text{ and } 7. \end{cases}$$

With the assumption that each of the 8 possible symbols are equally likely to occur at the transmitter, the overall symbol error rate under poor channel conditions using BPSK for demodulation may be denoted by $P_{BPSK}(e)$, and can be expressed as:

$$P_{BPSK}(e) = \frac{1}{2}Q\left[\sqrt{\frac{2E}{N_0}}\left(\sqrt{\beta}+\sqrt{\frac{1}{2}(1-\beta)}\right)\right] + \frac{1}{2}Q\left[\sqrt{\frac{2E}{N_0}}\left(\sqrt{\beta}-\sqrt{\frac{1}{2}(1-\beta)}\right)\right]$$

where $E_1=\beta E$ and $E_2=(1-\beta)E$ as described before. Note that the above equation also captures the dynamic power allocation property by incorporating the relationships of $E_1$ and $E_2$ through the power allocation factor $\beta$.

The Receivers of Good Channels

Where the receiver is subject to a good channel condition sufficient to guarantee effective decoding using 8-QAM, the probability of cross-over error may be expressed as:

$$P(e|s_i) = \begin{cases} 1 - Q\left[\sqrt{\frac{2E}{N_0}}\left(\sqrt{\frac{2}{3}} - \sqrt{\beta} - \sqrt{\frac{1}{2}(1-\beta)}\right)\right]Q\left[-\sqrt{\frac{E}{N_0}}\left(\sqrt{1-\beta}\right)\right] \\ \quad \text{for } i=1,4,5 \text{ and } 8. \\ 1 - \left\{ \begin{array}{l} Q\left[\sqrt{\frac{2E}{N_0}}\left(-\sqrt{\frac{2}{3}}+\sqrt{\beta}-\sqrt{\frac{1}{2}(1-\beta)}\right)\right] - \\ Q\left[\sqrt{\frac{2E}{N_0}}\left(\sqrt{\beta}-\sqrt{\frac{1}{2}(1-\beta)}\right)\right] \end{array} \right\} Q\left[-\sqrt{\frac{E}{N_0}}\left(\sqrt{1-\beta}\right)\right] \\ \quad \text{for } i=2,3,6 \text{ and } 7. \end{cases}$$

Assuming that each of the eight symbols are equally likely to be transmitted and received at the receiver with sufficient channel condition to justify the use of the 8-QAM demodulator directly, the total symbol error rate $P_{8\text{-}QAM}(e)$ can be expressed as:

$$P_{8\text{-}QAM}(e) = \frac{1}{2}[P(e|s_1)+P(e|s_2)] =$$

$$\frac{1}{2}\left\{1-Q\left[\sqrt{\frac{2E}{N_0}}\left(\sqrt{\frac{2}{3}}-\sqrt{\beta}-\sqrt{\frac{1-\beta}{2}}\right)\right]Q\left[-\sqrt{\frac{2E(1-\beta)}{N_0}}\right]\right\} + \frac{1}{2} -$$

$$\frac{1}{2}\left\{ \begin{array}{l} Q\left[\sqrt{\frac{2E}{N_0}}\left(-\sqrt{\frac{2}{3}}+\sqrt{\beta}-\sqrt{\frac{1-\beta}{2}}\right)\right] - \\ Q\left[\sqrt{\frac{2E}{N_0}}\left(\sqrt{\beta}-\sqrt{\frac{1-\beta}{2}}\right)\right] \end{array} \right\} Q\left[-\sqrt{\frac{E(1-\beta)}{N_0}}\right] =$$

$$\frac{1}{2}Q\left[\sqrt{\frac{2E}{N_0}}\left(\sqrt{\beta}+\sqrt{\frac{1-\beta}{2}}\right)\right] + \frac{1}{2}Q\left[\sqrt{\frac{2E}{N_0}}\left(\sqrt{\beta}-\sqrt{\frac{1-\beta}{2}}\right)\right]$$

The above may be used to derive a value for $\beta$ that optimally reduces the SER of a particular wireless transmission implementation.

Example Implementation

The following discussion is provided for illustrative purposes only and is not intended to narrow the possible implementations provided by the present invention. The logical SPC modulation/demodulation herein described is provided for multicast of scalable video bitstreams over AWGN channels. The logical SPC modulation scheme (denoted as L-SPCM) may be compared with a scheme using mono-modulation (denoted as MONO) as well as the standard SPC modulation scheme for video multicast using SIC (denoted as SPCM-SIC).

The video bitstream contains 2 quality layers. The L-SPCM and SPCM-SIC schemes map the information bits of base and enhancement layers into a 2-level SPC modulated signal. A group of receivers receive the SPC modulated signals at the same time and perform the corresponding demodulation scheme, where an amount of video information can be obtained according to their instantaneous channel conditions. Without loss of generality, BPSK/QPSK and BPSK/8-QAM is considered in SPCM-SIC and L-SPCM, respectively. It is assumed that the minimum threshold of instantaneous channel condition of a receiver must be at least 6 dB to demodulate the received SPC signal by both BPSK and QPSK using the SIC technique under SPCM-SIC, as opposed to only supporting BPSK to decode the base layer. Similarly in L-SPCM, the receiver, under a poor channel condition of under 6 dB, can only demodulate the information bits from the base layer by using BPSK. Otherwise, it can use 8-QAM to decode the information bits from both base and enhancement layers to obtain the full video quality. For MONO, a single modulation and demodulation scheme is taken in the transmitter and receivers, respectively.

In order to evaluate and compare the performance of the three approaches in transmitting successively refined information over SPC signals, the symbol throughput, T, is measured in terms of the average number of bits per symbol at each receiver. It is assumed that each transmission contains only one symbol, whereas this approach is still applicable when more than one symbol is accommodated in a transmission. The symbol throughput, T is defined in the following formula, where the dependency between the successive refined data in the higher and lower quality layers embedded in a SPC signal is considered when the channel condition of a receiver i is sufficient (i.e. >6 dB) to support the required modulation schemes.

$$T_i = \begin{cases} (1 - P_{BPSK}(e)) + 2(1 - P_{BPSK}(e))(1 - P_{QPSK}(e)), \text{ for } SPCM\text{-}SIC \\ (1 - P_{BPSK}(e)) + 2(1 - P_{BPSK}(e))(1 - P_{8\text{-}QAM}(e)), \text{ for } L\text{-}SPCM \end{cases}$$

For a receiver i undergoing a poor channel condition less than 6 dB, no attempt is made to decode any information from the enhancement layer. Thus T can be evaluated as:

$T_i = (1 - P_{BPSK})$, for both L-SPCM and SPCM-SIC

Utilizing only $T_i$ at each receiver cannot fairly evaluate a multicast scheme since there are many users of different channel conditions in a multicast scenario. Thus, the overall system performance, S, is defined in terms of bits yielded from the total symbol throughput that is realized by all receivers from decoding the same received SPC signal:

$S = \Sigma_{i=1}^{N} T_i$, where N is the total number of receivers decoding the same SPC signal in a multicast group.

Figure 6:
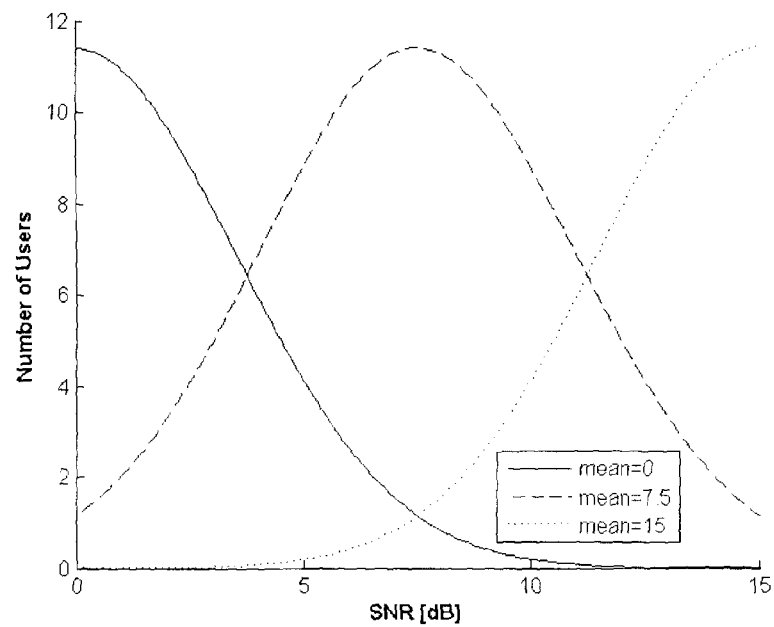
FIG. 6 illustrates system throughput of L-SPCM versus that of SPCM-SIC and MONO assuming a normal distribution of user channels.
Figure 6:
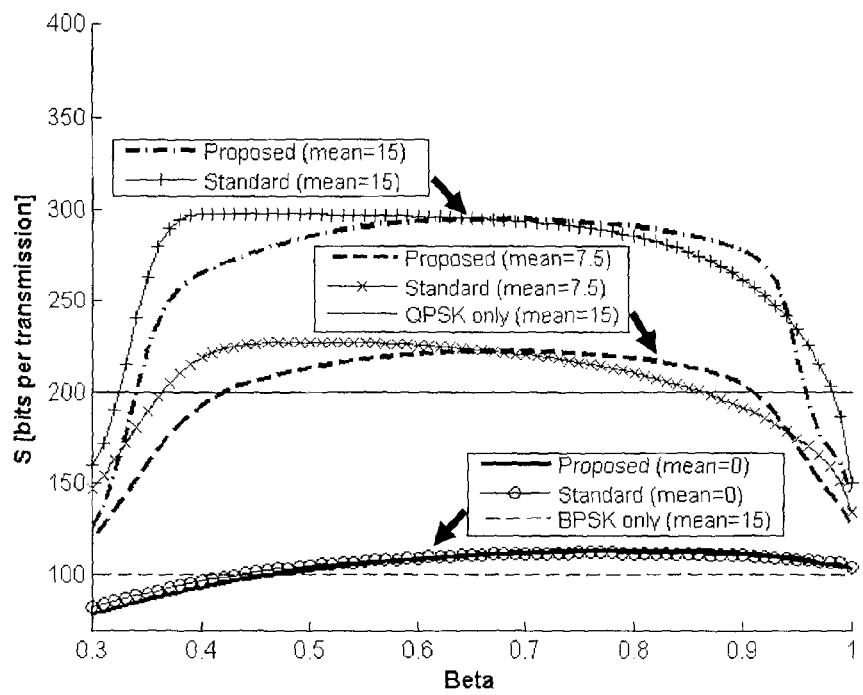
Figure 7:
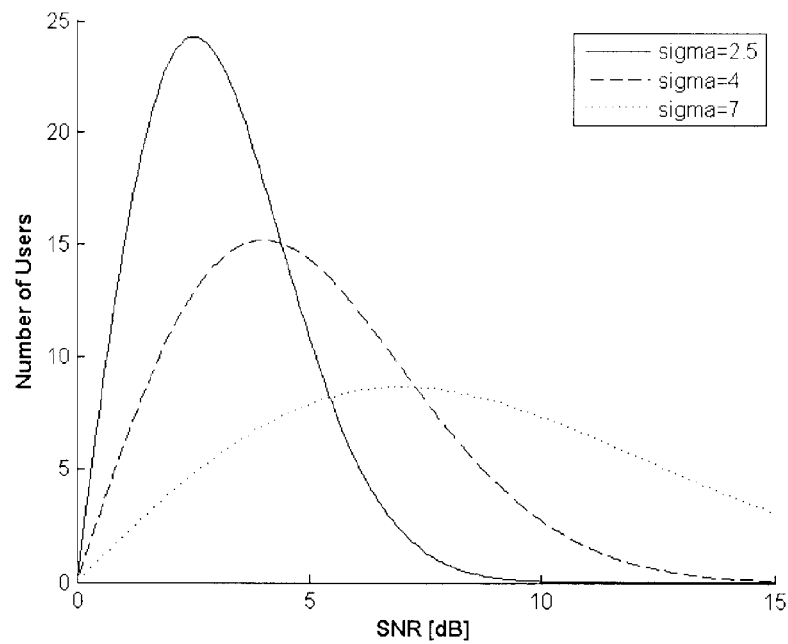
FIG. 7 illustrates system throughput of L-SPCM versus that of SPCM-SIC and MONO assuming a Rayleigh distribution of user channels.
Figure 7:
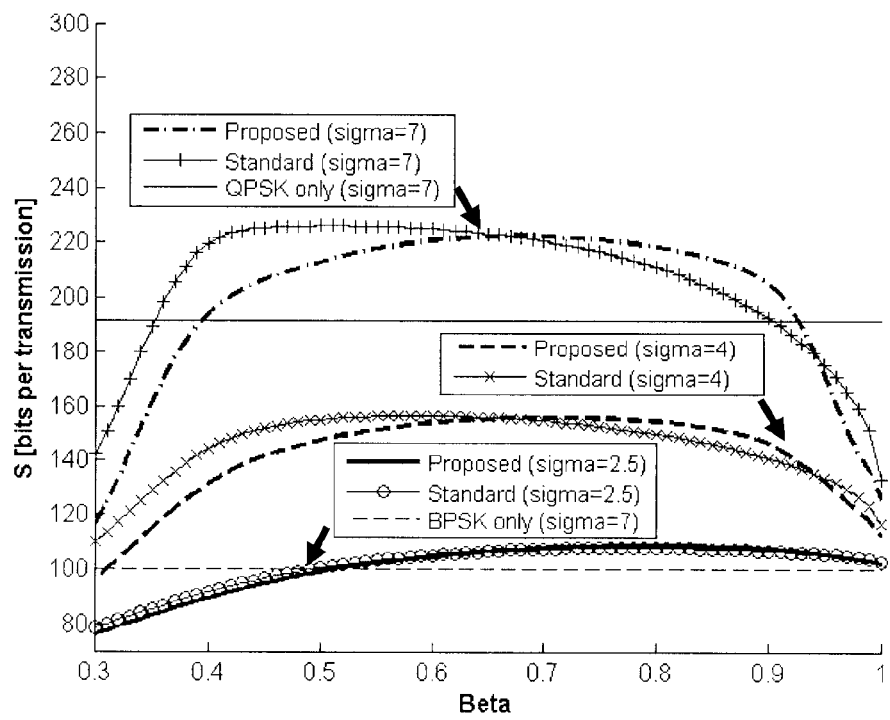

FIG. 6 illustrates system throughput of L-SPCM versus that of SPCM-SIC and MONO assuming a normal distribution of user channels. FIG. 7 illustrates system throughput of L-SPCM versus that of SPCM-SIC and MONO assuming a Rayleigh distribution of user channels. FIGS. 6(a) and 7(a) illustrate the histograms of long-term channel conditions of all the receivers are modeled using normal distributions and Rayleigh distributions of different parameters, respectively.

As can be observed in FIGS. 6(b) and 7(b), the selection of energy allocation factor, β, can affect the individual symbol throughput of a receiver, $T_i$, under L-SPCM and SPCM-SIC, and ultimately determine the overall multicasting performance. It is observed in FIG. 6(b) that the L-SPCM can typically outperform both SPCM-SIC and MONO when β is within 0.67-0.94, even though L-SPCM is realized with a much easier implementation at the transmitter and receivers. Similarly, it is observed in FIG. 7(b) that L-SPCM also yields better system performance with the same range (i.e., 0.67-0.94) of β under various Rayleigh distributions of receiver channel condition.

Thus, three observations are apparent, including: 1) when the majority of users are only able to sustain a SNR to decode the base layer (i.e., the cases of mean=0 in FIG. 6(a) and sigma=2.5 in FIG. 7(a)), both L-SPCM and SPCM-SIC perform equivalently, since the receivers are generally decoding the information bits of the base layer using BPSK; 2) in addition to the implementation advantages in L-SPCM, a better system throughput can be achieved when β is within a certain range (i.e., β=0.67–0.94) regardless of the type of user channel distributions. When more users experience a channel condition of higher SNR (i.e., higher value of mean or sigma), an even better performance gain of L-SPCM over SPCM-SIC is observed due to fact that more energy is allocated to the enhancement layers with the increase of β for 8-QAM than with QPSK. In the same range of β values, the receivers equipped with the standard SPC based on SIC technique can still be supported to demodulate the logical SPC signal with reasonable overall performance for compatibility purposes; 3) the performance of simply using BPSK alone and QPSK alone as indicated by the two flat lines in FIGS. 6(b) and 7(b), respectively, are generally less performing than either SPCM or SPCM-SIC in major range of β values, which conclude that the needs of using a SPC modulation for wireless video multicasting, especially the one with easier implementation and more scalable deployment as provided by the approach.

Further to the above observations, it can be shown that the maximum throughput of L-SPCM can be comparable to that of SPCM-SIC with the proper selection of β.

Figure 8:
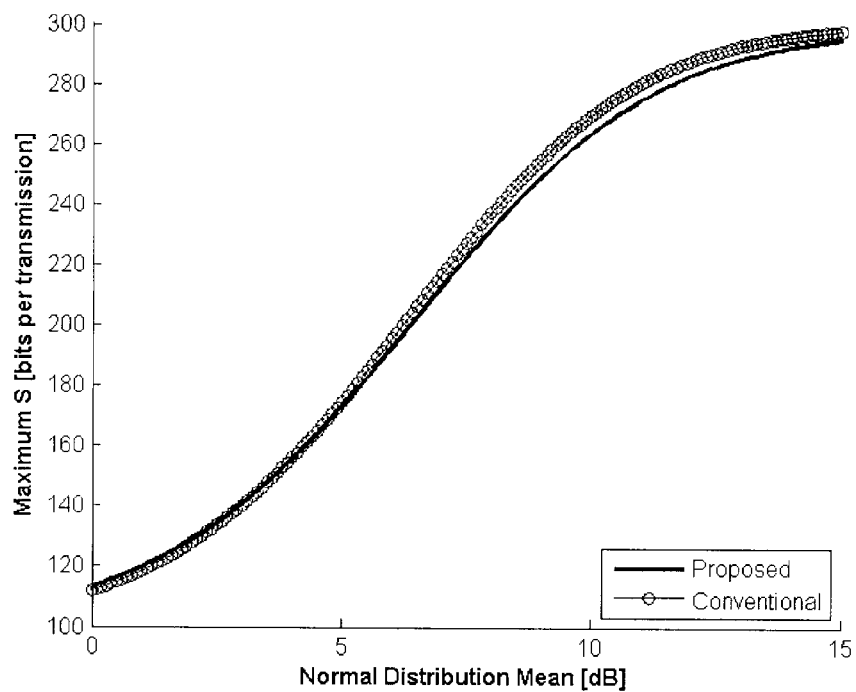
FIG. 8 illustrates comparable maximum system throughputs for L-SPCM and SPCM-SIC regardless of the average channel quality assuming normally distributed user channels.
Figure 9:
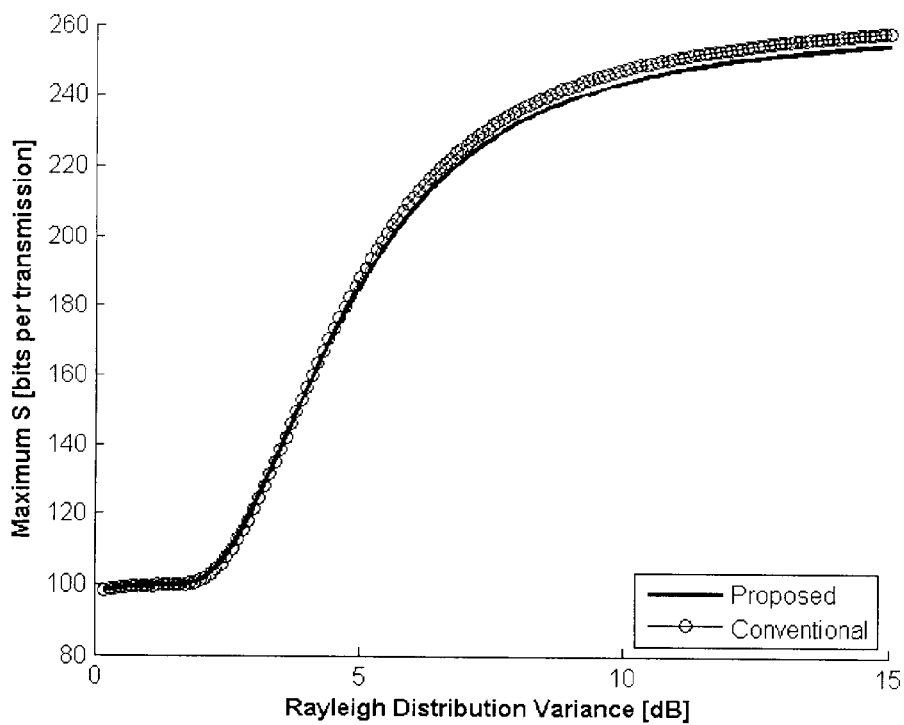
FIG. 9 illustrates comparable maximum system throughputs for L-SPCM and SPCM-SIC regardless of the average channel quality assuming Rayleigh distributed user channels.

FIG. 8 illustrates comparable maximum system throughputs for L-SPCM and SPCM-SIC regardless of the average channel quality assuming normally distributed user channels and FIG. 9 illustrates comparable maximum system throughputs for L-SPCM and SPCM-SIC regardless of the average channel quality assuming Rayleigh distributed user channels. It can be shown that, over a large range of average channel qualities, L-SPCM and SPCM-SIC may achieve comparable optimal system performance, S, with the proper choice of different β values. For attaining the maximum achievable system performance in each multicast transmission, β should be chosen based on a given receiver channel distribution characterized by the mean or sigma. As illustrated in FIGS. 8 and 9, the proposed approach can achieve the comparable optimal S under different values of means and sigmas, respectively, in both the normal and Rayleigh distributions. Both approaches may be evaluated and compared by using the β value that maximizes performance for both schemes, which can be derived by solving the first order derivative of $$\frac{dS}{d\beta} = 0.$$

These results prove that L-SPCM may achieve a comparable optimal system performance to SPCM-SIC, while offering a much easier implementation and deployment in realizing SPC modulation.

Furthermore, as is known to those skilled in the art, a transmitter can be made aware of current and historical channel conditions, for example using a feedback mechanism from the receivers to the transmitter. Therefore, the condition information could be used to provide an algorithm to choose an appropriate β to maintain optimal system throughput even where channel conditions are changing.

The invention claimed is:

1. A method for transmitting data to one or more receivers linked to a transmitter by a wireless channel, the method characterized by:
   (a) separating the data into one or more layers, each layer represented by one or more bits;
   (b) combining the bits of the layers into a bitstream, each possible bitstream combination being representable by a unique data point;
   (c) generating a modulated signal by modulating the bitstream with a first modulation scheme, the modulation scheme operable to modulate at least as many unique data points as there exist possible bitstream combinations; and
   (d) transmitting the modulated signal to the one or more receivers, each receiver operable to demodulate at least one of the layers using the first modulation scheme or one or more other modulation schemes, the other modulation schemes operable to demodulate a signal having fewer possible data points than is the first modulation scheme.

2. The method of claim 1, characterized in that the other modulation schemes have lower signal-to-noise ratio requirements than the first modulation scheme.

3. The method of claim 2, characterized in that the layers are quality layers and at least one of the other modulation schemes is operable to demodulate the modulated signal to reproduce the lowest quality layer.

4. The method of claim 1 or claim 3, characterized in that the first modulation scheme is 8QAM and at least a second modulation scheme is BPSK.

5. The method of claim 4, characterized in that a third modulation scheme is QPSK.

6. The method of claim 1, characterized in that the bitstream is a superimposed signal that is a summation of vectors corresponding to the bits of each layer.

7. The method of claim 6, characterized in that the superimposed signal is generated at the transmitter by dynamic keying of phase shift and energy or power allocation.

8. The method of claim 1, characterized in that the unique data points, when represented in a constellation diagram, are non-equidistant.

9. The method of claim 3, characterized in that the distance between unique data points is chosen such that the bits corresponding to the lowest quality layer are further apart than the distance corresponding to any of the other quality layers.

10. The method of claim 9, characterized in that the first modulation scheme has at least as many data points as the multiplication of data points for each of the other modulation schemes.

11. The method of claim 1, characterized in that at least three layers are provided, further comprising modulating at least one of the layers by at least one additional modulation scheme.

12. A system for transmitting data to one or more receivers, the system characterized by a transmitter linked to the one or more receivers by a wireless channel, wherein:
   (a) the transmitter includes or is linked to a data separating means for separating the data into one or more layers, each layer represented by one or more bits;
   (b) the transmitter includes or is linked to a bitstream generating means for combining the bits of the layers into a bitstream, each possible bitstream combination being representable by a unique data point; and
   (c) the transmitter includes or is linked to a modulator for generating a modulated signal by modulating the bitstream with a first modulation scheme, the modulation scheme operable to modulate at least as many unique data points as there exist possible bitstream combinations;
   wherein the transmitter transmits the modulated signal to the one or more receivers, each receiver operable to demodulate at least one of the layers using the first modulation scheme or one or more other modulation schemes, the other modulation schemes operable to demodulate a signal having fewer possible data points than is the first modulation scheme.

13. The system of claim 12, characterized in that the other modulation schemes have lower signal-to-noise ratio requirements than the first modulation scheme.

14. The system of claim 13, characterized in that the layers are quality layers and at least one of the other modulation schemes is operable to demodulate the modulated signal to reproduce the lowest quality layer.

15. The system of claim 12 or claim 14, characterized in that the first modulation scheme is 8QAM and at least a second modulation scheme is BPSK.

16. The system of claim 15, characterized in that a third modulation scheme is QPSK.

17. The system of claim 12, characterized in that the bitstream is a superimposed signal that is a summation of vectors corresponding to the bits of each layer.

18. The system of claim 17, characterized in that the superimposed signal is generated at the transmitter by dynamic keying of phase shift and energy or power allocation.

19. The system of claim 12, characterized in that the unique data points, when represented in a constellation diagram, are non-equidistant.

20. The system of claim 14, characterized in that the distance between unique data points is chosen such that the bits corresponding to the lowest quality layer are further apart than the distance corresponding to any of the other quality layers.

21. The system of claim 20, characterized in that the first modulation scheme has at least as many data points as the multiplication of data points for each of the other modulation schemes.

22. The system of claim 21, characterized in that at least three layers are provided, the modulator further operable to modulate at least one of the layers by at least one additional modulation scheme.

23. A non-transitory computer readable storage medium having program instructions stored thereon, wherein the program instructions, when executed by one or more computer processors linked to a transmitter operable to transmit data over a wireless channel, are operable to provide a means for transmitting data to one or more receivers linked to the wireless channel, characterized in that the computer program is operable to perform the steps of:
   (a) separating the data into one or more layers, each layer represented by one or more bits;
   (b) combining the bits of the layers into a bitstream, each possible bitstream combination being representable by a unique data point;
   (c) generating a modulated signal by modulating the bitstream with a first modulation scheme, the modulation scheme operable to modulate at least as many unique data points as there exist possible bitstream combinations; and (d) transmitting the modulated signal to the one or more receivers, each receiver operable to demodulate at least one of the layers using the first modulation scheme or one or more other modulation schemes, the other modulation schemes operable to demodulate a signal having fewer possible data points than is the first modulation scheme.

24. The non-transitory computer readable storage medium of claim 23, characterized in that the other modulation schemes have lower signal-to-noise ratio requirements than the first modulation scheme.

25. The non-transitory computer readable storage medium of claim 24, characterized in that the layers are quality layers and at least one of the other modulation schemes is operable to demodulate the modulated signal to reproduce the lowest quality layer.

26. The non-transitory computer readable storage medium of claim 23 or claim 25, characterized in that the first modulation scheme is 8QAM and at least a second modulation scheme is BPSK.

27. The non-transitory computer readable storage medium of claim 26, characterized in that a third modulation scheme is QPSK.

28. The non-transitory computer readable storage medium of claim 23, characterized in that the bitstream is a superimposed signal that is a summation of vectors corresponding to the bits of each layer.

29. The non-transitory computer readable storage medium of claim 28, characterized in that the superimposed signal is generated at the transmitter by dynamic keying of phase shift and energy or power allocation.

30. The non-transitory computer readable storage medium of claim 23, characterized in that the unique data points, when represented in a constellation diagram, are non-equidistant.

31. The non-transitory computer readable storage medium of claim 25, characterized in that the distance between unique data points is chosen such that the bits corresponding to the lowest quality layer are further apart than the distance corresponding to any of the other quality layers.

32. The non-transitory computer readable storage medium of claim 31, characterized in that the first modulation scheme has at least as many data points as the multiplication of data points for each of the other modulation schemes.

33. The non-transitory computer readable storage medium of claim 23, characterized in that at least three layers are provided, the computer program product further operable to perform the step of modulating at least one of the layers by at least one additional modulation scheme.

* * * * *